United States Patent
Toriumi et al.

(10) Patent No.: US 10,434,957 B2
(45) Date of Patent: Oct. 8, 2019

(54) VEHICLE INTERIOR STRUCTURE

(71) Applicant: CALSONIC KANSEI CORPORATION, Saitama (JP)

(72) Inventors: Takahiro Toriumi, Saitama (JP); Kazuhiro Matsuda, Saitama (JP)

(73) Assignee: CALSONIC KANSEI CORPORATION, Saitama (JP)

(*) Notice: Subject to any disclaimer, the term of this patent is extended or adjusted under 35 U.S.C. 154(b) by 0 days.

(21) Appl. No.: 16/075,019

(22) PCT Filed: Feb. 1, 2017

(86) PCT No.: PCT/JP2017/003529
§ 371 (c)(1),
(2) Date: Aug. 2, 2018

(87) PCT Pub. No.: WO2017/135274
PCT Pub. Date: Aug. 10, 2017

(65) Prior Publication Data
US 2019/0039534 A1    Feb. 7, 2019

(30) Foreign Application Priority Data
Feb. 3, 2016  (JP) .................................. 2016-019058

(51) Int. Cl.
*B60R 7/04*    (2006.01)
*B60R 13/02*   (2006.01)

(52) U.S. Cl.
CPC ...... *B60R 13/0206* (2013.01); *B60R 13/0256* (2013.01); *B60R 7/04* (2013.01); *B60R 2013/0293* (2013.01)

(58) Field of Classification Search
CPC ... B60R 13/0206; B60R 13/0256; B60R 7/04; B60R 2013/0293

USPC ............................................................ 296/70
See application file for complete search history.

(56) References Cited

U.S. PATENT DOCUMENTS 8,181,991 B2 *  5/2012  Dei ........................ B60K 37/00
                                                              24/295

FOREIGN PATENT DOCUMENTS

| JP | 2007182170 A | 7/2007 |
| JP | 2008062808 A | 3/2008 |
| JP | 2011033041 A | 2/2011 |

OTHER PUBLICATIONS

English Translation of International Search Report from PCT/JP2017/003529 dated Mar. 7, 2017 (1 page).

* cited by examiner

*Primary Examiner* — Pinel E Romain
(74) *Attorney, Agent, or Firm* — Calfee, Halter & Griswold LLP

(57) ABSTRACT

To prevent a vehicle body member from being damaged when an interior component is attached. In a vehicle interior structure, an interior component is fastened to a vehicle body member provided interior of a vehicle by an engagement portion. The engagement portion includes a hole formed in the vehicle body member, a claw portion provided in the interior component, and a pedestal provided in a base part of the claw portion. A guide portion is provided in the vehicle body member to guide the pedestal before the claw portion is fitted into the hole to engage with the hole, so as to prevent an end portion of the interior component from contacting the vehicle body member.

3 Claims, 4 Drawing Sheets

VEHICLE INTERIOR STRUCTURE

CROSS-REFERENCE TO RELATED APPLICATION

This application is based upon and claims the benefit of priority from Japanese Patent Application No. 2016-019058 filed on Feb. 3, 2016, the entire disclosure of which is incorporated herein by reference.

TECHNICAL FIELD

The present disclosure relates to a vehicle interior structure.

BACKGROUND ART

A vehicle body member such as an instrument panel is mounted on a front portion of an interior of a vehicle such as an automobile.

An interior component such as a glove box is attached to the vehicle body member such as an instrument panel by an engagement portion (see JP 2011-33041A, for example).

The engagement portion includes a hole formed in the vehicle body member, a claw portion provided in the interior component, and a pedestal provided in a base part of the claw portion. The claw portion is inserted into the hole to engage with the hole, so that the glove box is fastened to the instrument panel by the claw portion.

SUMMARY

However, the vehicle interior structure described in Patent Literature 1 has the following problem. More specifically, when the glove box is attached to the instrument panel, the instrument panel may be damaged by an end portion of the glove box which contacts the instrument panel. For this reason, it is necessary to carefully attach the glove box to the instrument panel.

It is, therefore, an object of the present disclosure to solve the above problem.

To achieve the above object, the present disclosure is a vehicle interior structure including a vehicle body member provided in an interior of a vehicle, an interior component attached to the vehicle body member, an engagement portion that fastens the interior component to the vehicle body member, and a guide portion provided in the vehicle body member, wherein the engagement portion includes a hole formed in the vehicle body member, a claw portion provided in the interior component, and a pedestal provided in a base part of the claw portion, and the guide portion guides the pedestal before the claw portion is fitted into the hole to engage with the hole, so as to prevent an end portion of the interior component from contacting the vehicle body member.

DESCRIPTION OF EMBODIMENT

Hereinafter, an embodiment is described in details with reference to the drawings. FIGS. 1 to 6 are views describing this embodiment.

First Embodiment

Hereinafter, configurations of the embodiment are described.

Figure 1:
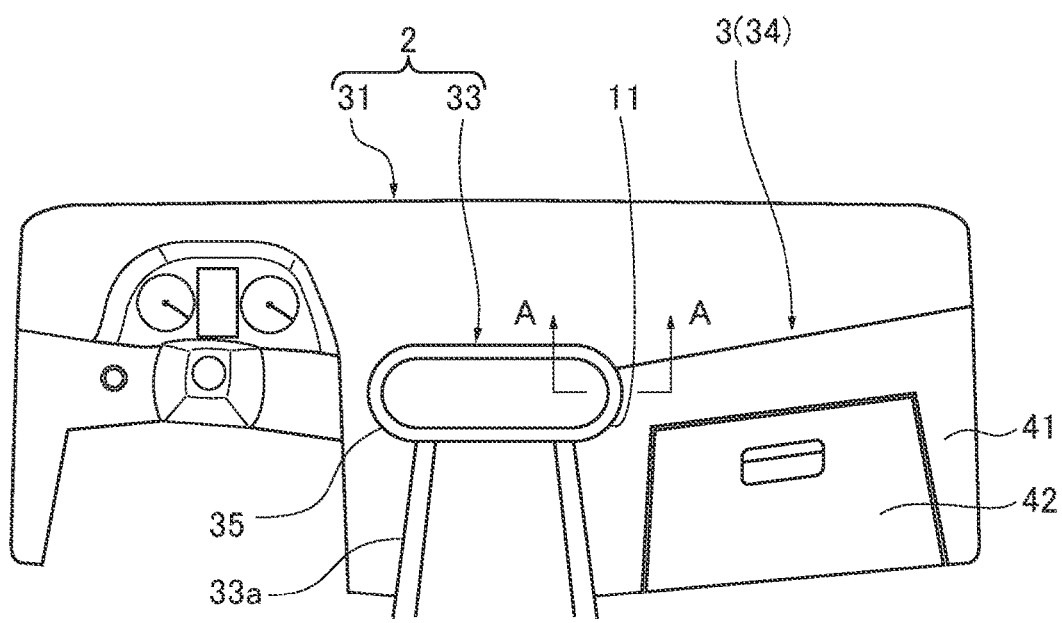
FIG. 1 is an entire view (front view seen from vehicle back side) illustrating a vehicle interior structure according to an embodiment.
Figure 2:
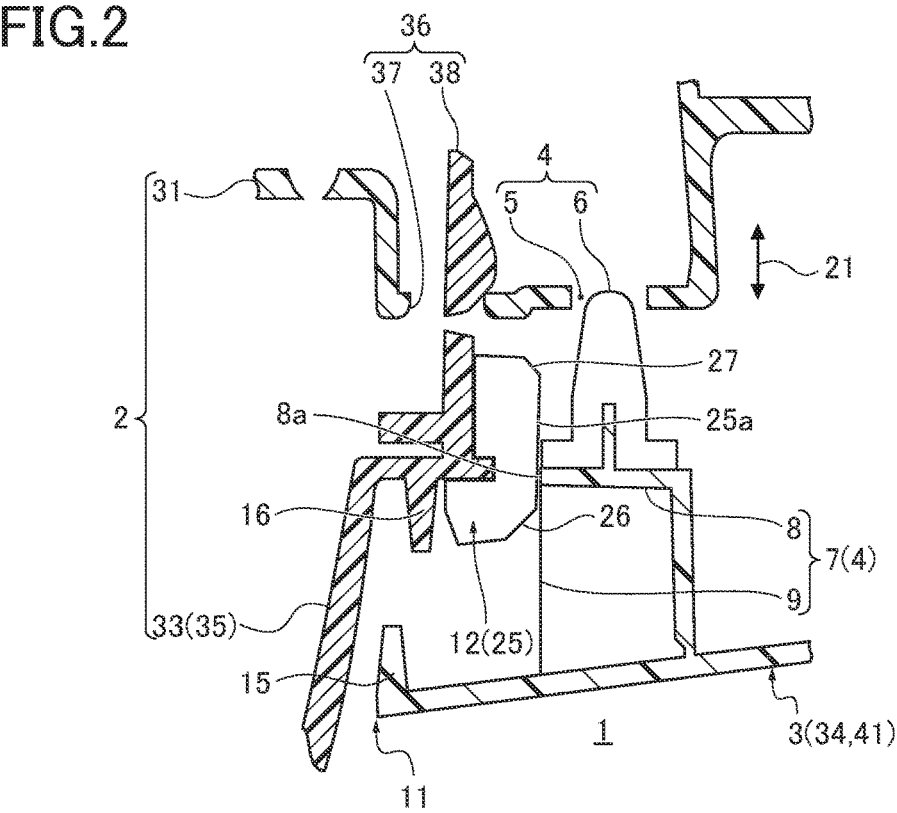
FIG. 2 is sectional view (before fitting of engagement portion) along a line A-A in FIG. 1.

As illustrated in FIG. 1, a vehicle body member 2 is mounted on an interior 1 of a vehicle such as an automobile. As illustrated in FIG. 2 (FIG. 3), an interior component 3 is fastened to the vehicle body member 2 by an engagement portion 4. In this vehicle interior structure, the engagement portion 4 includes a hole 5 formed in the vehicle body member 2, a claw portion 6 provided in the interior component 3, and a pedestal 7 provided in a base part of the claw portion 6.

The vehicle body member 2 and the interior component 3 are described later. A single or a plurality of engagement portions 4 is provided between the vehicle body member 2 and the interior component 3. The claw portion 6 is fitted into the hole 5 to engage with the hole 5. The claw portion 6 includes various types such as a resin integrated claw portion or a claw portion having a metal clip. Any type of the claw portion 6 may be used. The claw portion 6 typically has a thickness thicker than an average thickness of the interior component 3 in order to obtain rigidity required for fastening.

The pedestal 7 is provided for adjusting a height of fitting the claw portion 6 into the hole 5, and for preventing sink marks from generating on a surface of the interior component 3. In addition, imperfect molding such as sink marks often occurs in a portion having a varied thickness due to resin flow in injection molding. For this reason, if the claw portion 6 projects directly from the interior component 3, sink marks easily generate on the surface of the interior component 3 because the interior component 3 has a varied thickness due to the claw portion 6. Such sink marks on the surface of the interior component 3 are prevented by providing, between the interior component 3 and the claw portion 6, the pedestal 7 having the same thickness as the interior component 3.

The pedestal 7 has substantially a rectangular solid shape. The pedestal 7 has a top surface 8 in a size capable of enclosing the claw portion 6. The pedestal 7 includes three sides as walls and one side provided with an opening portion 9 as an entrance and an exit of a sliding mold in the injection molding of the pedestal 7. The pedestal 7 is slightly tapered toward a leading end (claw portion 6) to be capable of being demolded.

This embodiment includes the following configurations in addition to the above basic configurations.

(1) A guide portion 12 is provided in the vehicle body member 2. The guide portion 12 guides the pedestal 7 before the claw portion 6 is fitted into the hole 5 to engage with the hole 5, so as to prevent an end portion 11 of the interior component 3 from contacting the vehicle body member 2.

The end portion 11 of the interior component 3 is provided with a flange 15 for positioning to the vehicle body member 2. The vehicle body member 2 is provided with a rib 16 for receiving the flange 15 of the interior component 3. The flange 15 is locked to the rib 16 when the claw portion 6 is fitted into the hole 5 to engage with the hole 5. When the guide portion 12 is not provided in the vehicle body member 2, the flange 15 is likely to contact the vehicle body member 2.

The guide portion 12 is provided to guide the pedestal 7 (guided portion) of at least one engagement portion 4 (when a plurality of engagement portions 4 is provided). In this case, the guide portion 12 is provided to guide the pedestal 7 of the engagement portion 4 close to the end portion 11 of the interior component 3.

Any kind of the guide portion 12 may be used as long as the guide portion 12 guides the pedestal 7 only before the claw portion 6 is fitted into the hole 5 to engage with the hole 5. The guide portion 12 prevents the end portion 11 of the interior component 3 from contacting a part of the vehicle body member 2 which is exposed inside the interior 1.

(2) When the claw portion 6 is fitted into the hole 5 to engage with the hole 5, the guide portion 12 is free from guiding the pedestal 7.

The guide portion 12 guides the pedestal 7 just before the claw portion 6 is fitted into the hole 5 to engage with the hole 5. The guide portion 12 is free from guiding the pedestal 7 when the guiding operation by the guide portion 12 is completed at the time that the claw portion 6 is fitted into the hole 5 to engage with the hole 5. Alternatively, the guide portion 12 is free from guiding the pedestal 7 when the guide portion 12 does not contact the pedestal 7 (provided in base part of claw portion 6) at the time that the claw portion 6 is fitted into the hole 5 to engage with the hole 5.

(3) More specifically, the guide portion 12 extends in a fitting direction 21 of the claw portion 6 into the hole 5. The guide portion 12 is also shorter than the pedestal 7.

The guide portion 12 is a guide rib 25 extending substantially in the fitting direction 21. The guide rib 25 may extend in the direction slightly different from the fitting direction 21 to an extent which does not disturb the guiding operation. It is preferable for a guide surface 25a of the leading end of the guide rib 25 to be parallel to the fitting direction 21. The guide surface 25a may slightly incline from the fitting direction 21 to an extent where the end portion 11 of the interior component 3 does not contact the vehicle body member 2. For example, the guide surface 25a of the guide rib 25 may include an inclination such that the end portion 11 of the interior component 3 gradually comes close to the vehicle body member 2 along the fitting direction 21.

The pedestal 7 is provided such that the opening portion 9 faces the guide rib 25. An end portion 8a of the top surface 8 of the pedestal 7 is thereby guided by the guide rib 25. The guide portion 12 (length in extending direction or fitting direction 21) is set to be shorter than the height of the opening portion 9 of the pedestal 7. Such heights overlap the guide surface 25a of the guide rib 25 with the position of the opening portion 9, or the guide surface 25a of the guide rib 25 with the position of the opening portion 9 such that the guide surface 25a enters inside (inside space) the pedestal 7 from the opening portion 9. The guide portion 12 is thereby free from guiding the pedestal 7.

Both end portions of the guide rib 25 are provided with tapered portions 26, 27, respectively. The tapered portions 26, 27 are used for smoothly starting the guiding of the end portion 8a of the top surface 8 of the pedestal 7.

(4) As a specific application example, the vehicle body member 2 includes an instrument panel 31 and a center member 33 mounted on a central portion of the instrument panel 31 in the vehicle width direction. The interior component 3 is a glove box 34 disposed close to the center member 33. The guide portion 12 prevents the end portion 11 of the glove box 34 from contacting the center member 33.

The instrument panel 31 is a large resin interior panel mounted on a front portion of the interior 1. The center member 33 is a small resin sub panel attached to the instrument panel 31. Before the center member 33 is attached to the instrument panel 31, the instrument panel 31 is the vehicle body member 2 and the center member 33 is the interior component 3. More specifically, the vehicle body member 2 and the interior component 3 have a relative relationship. Accordingly, the above guide portion 12 can be applied between the instrument panel 31 and the center member 33. The vehicle body member 2 and the interior component 3 are not limited to the instrument panel 31, the center member 33, and the glove box 34.

In this embodiment, the center member 33 is a center cluster panel including in an upper portion thereof an attachment frame 35 to which an air conditioning controller is attached. The attachment frame 35 has a shape laterally expanded to be larger than a lower portion (main body 33a) of the center member 33. The shape of the attachment frame 35 allows the (large) air conditioning controller to be attached to the attachment frame 35, improves the design of the attachment frame 35, or allows the attachment frame 35 to be easily recognized. A cutout portion which avoids the side of the attachment frame 35 is formed in the upper portion of the end portion 11 of the glove box 34 (refer to FIG. 1).

The center member 33 is fastened to the instrument panel 31 by an engagement portion 36. The engagement portion 36 includes a hole 37 formed in the instrument panel 31 and a claw portion 38 provided in the center member 33. A pedestal similar to that of the engagement portion 4 may be provided in a base part of the claw portion 38, or may not be provided. In this case, the center member 33 is conceded by the glove box 34 in the portion of the engagement portion 36. Such a configuration eliminates a need for adjusting a height or has a no problem of sink marks. Consequently, the engagement portion 36 does not include the pedestal.

The glove box 34 includes various types such as an openable and closable lid or a basket. Any type of the glove box 34 may be used. In this case, the glove box 34 includes a fastening portion 41 (for example, main body) and a movable portion 42 (see FIG. 1, for example, lid or basket). The engagement portion 4 (claw portion 6) is provided in the fastening portion 41. In addition, the glove box 34 is one of large and heavy components as the interior components 3 to be attached to the instrument panel 31, which requires special care in handling.

The engagement portion 4 (claw portion 6) and the engagement portion 36 (claw portion 38) are appropriately provided in the upper and lower corner portions of the center member 33 or the glove box 34 (fastening portion 41) or the middle portion between the corner portions. In this embodiment, as the upper portions of the glove box 34 and the center member 33 are substantially aligned, the upper corner portions are located at the substantial same heights.

The engagement portion 4 (claw portion 6) and the engagement portion 36 (claw portion 38) provided in the upper corner portions of the center member 33 and the glove box 34 are located close to each other. As described above, the side of the upper attachment frame 35 of the center member 33 is prominently provided and has the laterally expanded shape to be easily recognized. Such a side of the upper attachment frame 35 is most likely to be damaged by the attachment of the glove box 34, and the damage on the side of the upper attachment frame 35 is most prominent. For this reason, the guide portion 12 which guides the upper pedestal 7 of the glove box 34 is provided in the base part of the upper claw portion 38 of the center member 33.

Hereinafter, the operations of the embodiment are described.

The interior component 3 is fastened to the vehicle body member 2 by the engagement portion 4. In this case, the claw portion 6 of the interior component 3 is fitted into the hole 5 of the vehicle body member 2, so that the engagement portion 4 is locked. The pedestal 7 provided in the base part of the claw portion 6 can adjust the height of fitting the claw portion 6 into the hole 5 to optimally attach the interior component 3 to the vehicle body member 2. The pedestal 7 provided between the claw portion 6 and the interior component 3 prevents sink marks due to the claw portion 6 from generating on the surface of the interior component 3.

Figure 4:
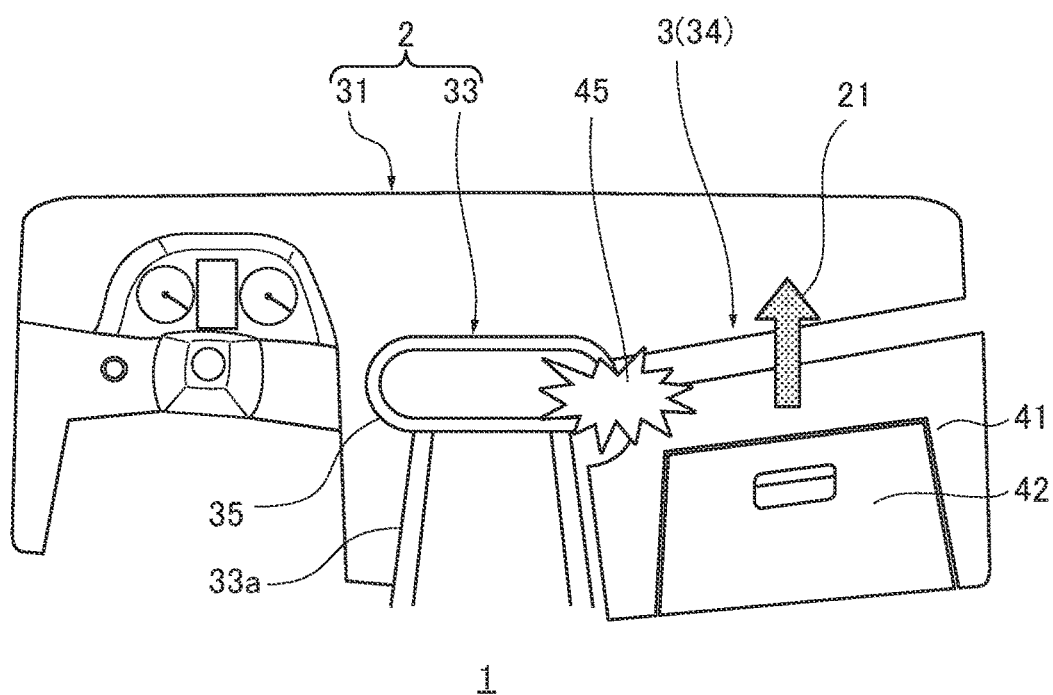
FIG. 4 is an operation view (front view as seen from vehicle back side similar to FIG. 1) when a guide portion is not provided.
Figure 5:
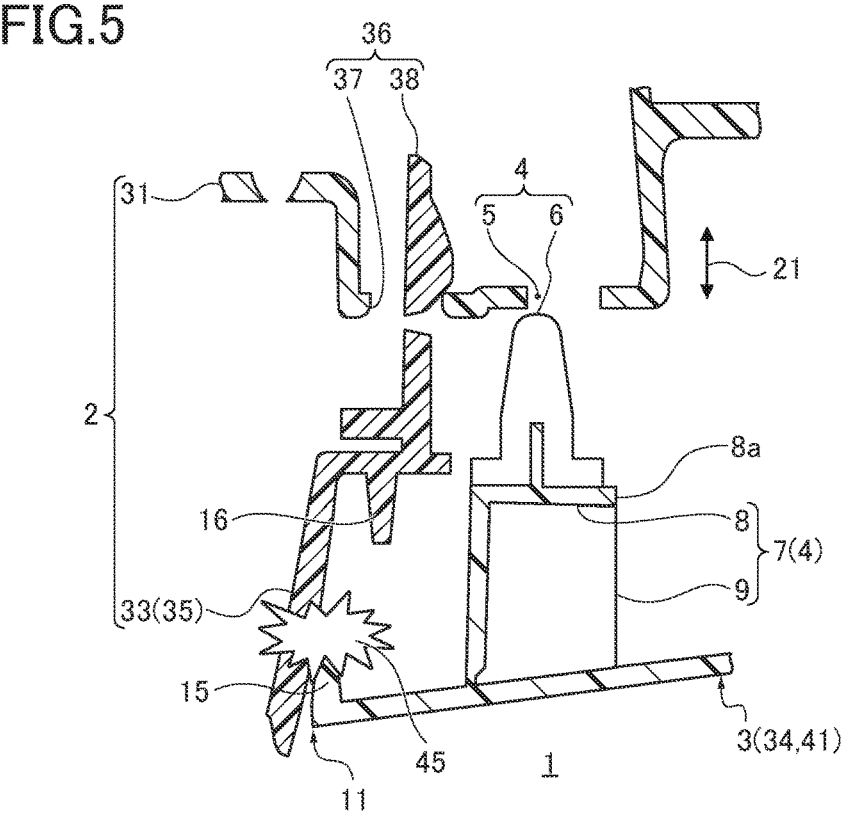
FIG. 5 is a sectional view (before fitting of engagement portion) of FIG. 4, similar to FIG. 2.
Figure 6:
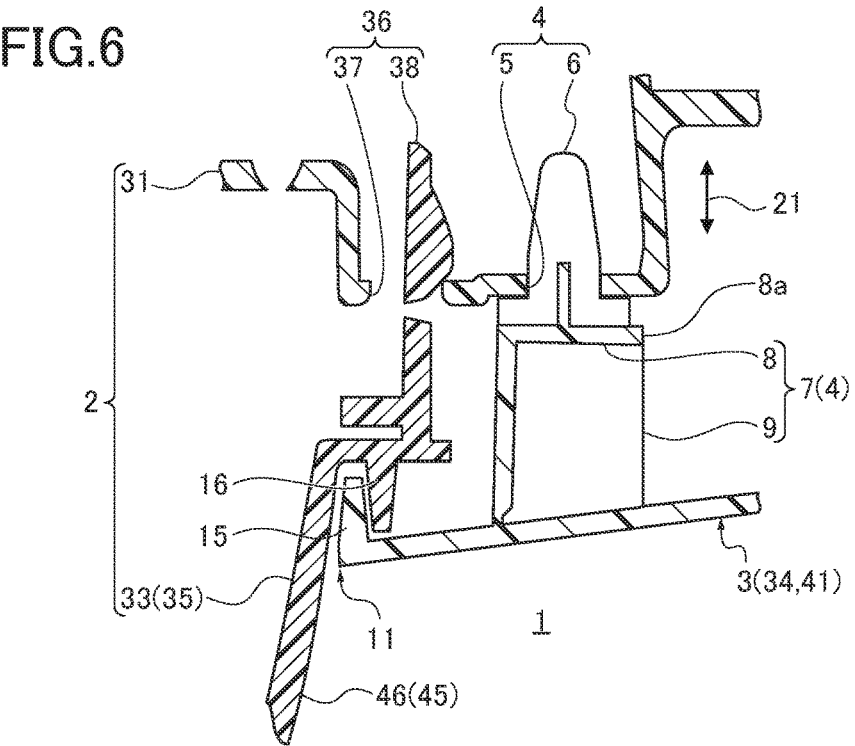
FIG. 6 is a sectional view (after fitting of engagement portion) of FIG. 4, similar to FIG. 3.

In this case, as illustrated in FIG. 4 (also refer to FIGS. 5, 6), if the end portion 11 (flange 15) of the interior component 3 contacts (contact portion 45) the vehicle body member 2 (portion exposed inside interior 1) when the interior component 3 is attached to the vehicle body member 2, the vehicle body member 2 is damaged as a scratch 46 (refer to FIG. 6), which deteriorates a quality of a product.

According to the embodiment, the following effects can be obtained.

Figure 3:
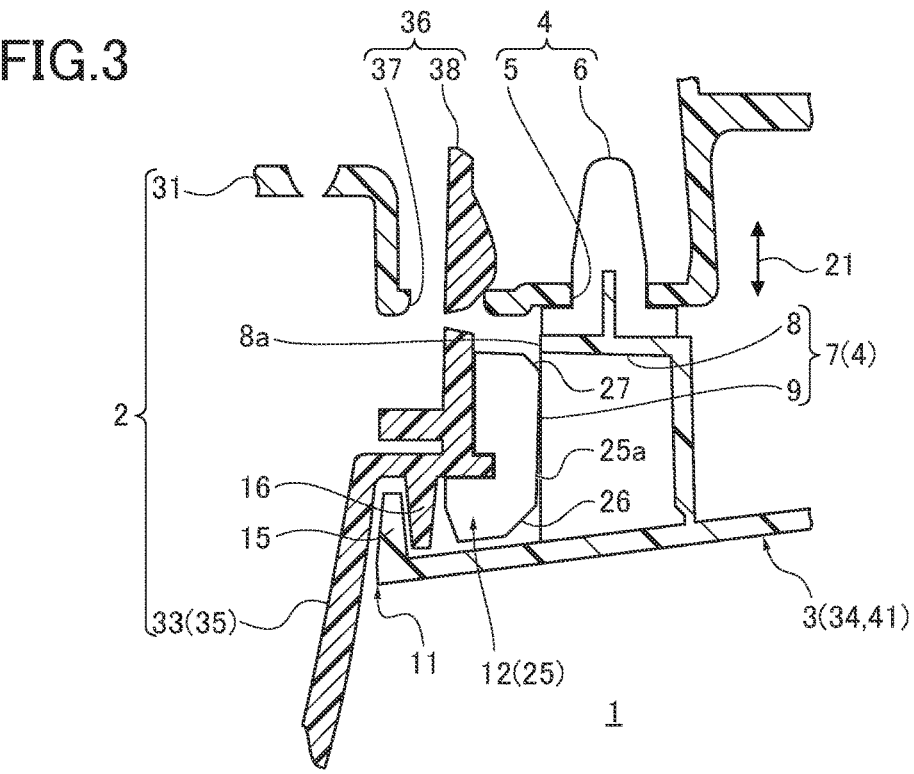
FIG. 3 is a sectional view, similar to FIG. 2, illustrating the engagement portion after being fitted.

(Effect 1) The guide portion 12 is provided in the vehicle body member 2. The guide portion 12 guides the pedestal 7 of the claw portion 6 as illustrated in FIGS. 2, 3. The guide portion 12 which guides the pedestal 7 prevents the end portion 11 of the interior component 3 (flange 15) from contacting the vehicle body member 2 (portion exposed inside interior 1) before the claw portion 6 is fitted into the hole 5 to engage with the hole 5.

As a result, the vehicle body member 2 is prevented from being damaged as the scratch 46 due to the contact of the end portion 11 of the interior component 3 to the vehicle body member 2 when the interior component 3 is attached to the vehicle body member 2. The quality of the product can be thereby maintained.

In this case, it is suitable for the pedestal 7 to be guided by the guide portion 12 as the pedestal 7 is relevant to the claw portion 6.

As the pedestal 7 is structurally larger than the claw portion 6 (or has the top surface 8 capable of enclosing the claw portion 6), the vehicle body member 2 and the interior component 3 are maintained at an interval to avoid the contact of these member and component by guiding the pedestal 7 with the guide portion 12. Accordingly, the pedestal 7 is most suitable as the guided component.

As described above, the guide portion 12 reliably prevents the vehicle body member 2 from being damaged. It becomes therefore unnecessary to carefully attach the interior component 3 to the vehicle body member 2. The attachment of the interior component 3 can be simplified.

(Effect 2) The guide portion 12 is free from guiding the pedestal 7 when the claw portion 6 is fitted into the hole 5 to engage with the hole 5. The guiding operation of the guide portion 12 thereby effectively operates in the first half of the attachment operation of the interior component 3 while the guide portion 12 is free from the guiding operation in the second half of the attachment operation. Consequently, the guide portion 12 does not disturb that the interior component 3 is reliably fastened to the vehicle body member 2 by the engagement portion 4 in the second half of the attachment operation. More specifically, such a configuration prevents the double restrictions by the guide portion 12 and the engagement portion 4. Thus, the fitting and engagement operation of the claw portion 6 with the hole 5 is reliably performed.

Moreover, as the guide portion 12 guides the pedestal 7 provided in the base part of the claw portion 6, the switching timing of the guiding operation of the guide portion 12 and the fitting and engagement operation of the engagement portion 4 can be simply and reliably set and adjusted.

(Effect 3) The guide portion 12 extends in the fitting direction 21 of the claw portion 6 into the hole 5, and is shorter (guide rib 25) than the height of the inside (inside space) of the pedestal 7. Accordingly, the guide surface 25a of the guide rib 25 of the guide portion 12 overlaps with the position of the opening portion 9, or the guide surface 25a of the guide rib 25 enters inside (inside space) the pedestal 7 from the opening portion 9. As a result, the guide portion 12 is retracted in the opening portion 9 of the pedestal 7. Thus, the guide portion 12 is free from guiding the pedestal 7, and the inside space of the pedestal 7 can be effectively used for preventing the double restrictions.

(Effect 4) The vehicle body member 2 is the instrument panel 31 and the center member 33, and the interior component 3 is the glove box 34 disposed close to the center member 33. The guide portion 12 thereby reliably prevents the center member 33 from being damaged by the contact of the end portion 11 of the glove box 34 to the center member 33 mounted on the instrument panel 31 when the glove box 34 is attached to the instrument panel 31 on which the center member 33 is mounted. Thus, the glove box 34 can be simply attached to the instrument panel 31 without damaging the center member 33.

The effect of reinforcing the vehicle body member 2 (claw portion 38 of center member 33) can be obtained by providing the guide portion 12 in the base part of the claw portion 38, which attaches the center member 33 to the instrument panel 31, or therearound.

What is claimed is:

1. A vehicle interior structure comprising:
   a vehicle body member provided in an interior of a vehicle;
   an interior component attached to the vehicle body member;
   an engagement portion that fastens the interior component to the vehicle body member; and
   a guide portion provided in the vehicle body member, wherein
   the engagement portion comprises a hole formed in the vehicle body member, a claw portion provided in the interior component, and a pedestal provided in a base part of the claw portion,
   the guide portion guides the pedestal before the claw portion is fitted into the hole to engage with the hole, so as to prevent an end portion of the interior component from contacting the vehicle body member, and
   the guide portion is free from guiding the pedestal when the claw portion is fitted into the hole to engage with the hole.

2. The vehicle interior structure according to claim 1, wherein
   the guide portion extends in a fitting direction of the claw portion into the hole, and
   the guide portion is shorter than the pedestal.

3. The vehicle interior structure according to claim 1, wherein
 the vehicle body member comprises an instrument panel and a center member mounted on a center portion of the instrument panel in a vehicle width direction,
 the interior component is a glove box disposed close to the center member, and
 the guide portion prevents an end portion of the glove box from contacting a portion of the center member, which is exposed inside the interior of the vehicle.

* * * * *